Patented Oct. 15, 1946

2,409,443

UNITED STATES PATENT OFFICE 2,409,443

INSTRUMENT LUBRICANT

John D. Morgan, South Orange, and Russell E. Lowe, East Orange, N. J., assignors to Cities Service Oil Company, New York, N. Y., a corporation of Pennsylvania No Drawing. Application July 21, 1944, Serial No. 546,057

5 Claims. (Cl. 252—49.8)

This invention relates to lubricants and more particularly to oils for lubricating bearings of gyro instruments and other precision devices which present substantially similar lubricating requirements.

The lubrication of gyro instruments presents problems of a unique nature which are not encountered in the lubrication of automobiles, industrial machinery and similar heavy equipment. Thus it is characteristic that such instruments operate at comparatively high speeds for extended periods of time, and that the torque available for driving their moving parts is of a very low order. Unusually good lubrication of the bearings of these instruments is therefore essential so that as little of the available driving energy as possible shall be lost through friction and so that wear may be reduced to a very minimum.

The problem is further complicated by the fact that gyro instruments are used largely on aircraft where they are subjected to a wide range of operating temperatures and diverse atmospheric conditions. A satisfactory lubricant must therefore be fairly light in body, and of course, substantially frictionless. It must also be stable and remain in liquid form at extremely low temperatures as well as at fairly high ones.

Since the bearings of the gyro, as well as other precision instruments, are not particularly easy of access it is the practice to lubricate them only at infrequent intervals. The drop of lubricant used must be capable of staying where it is put and have substantially no tendency to spread and creep away to adjoining surfaces so as to leave a dry bearing. It is accordingly essential that the instrument lubricant must have a very much lower spread factor than that of oils which are used for more normal lubricating service.

It is a further necessity that the lubricant shall be highly resistant to oxidation so that it will not become rancid, nor break down to form acids which will attack the bearing metal, nor produce gums to clog the bearings and associated mechanism. Along the same line, of course, the lubricant itself should be of a non-corrosive character.

We have found that the foregoing requirements and others can be met by a lubricant comprising a blend of tricresyl phosphate and ethylene glycol monobenzyl ether. These ingredients in about equal proportions provide a liquid which is well adapted to meet normal instrument lubrication requirements. We have further found that the addition of tri ethylene glycol di-2-ethylbutyrate to the above mentioned ingredients materially improves the properties of the lubricant, and provides a liquid which is ideally suited for the lubrication of the bearings of gyro instruments and other instruments and precision devices which present comparable requirements. These three ingredients may be mixed in proportions to give a liquid having a desired viscosity within required limits, low clouding and pour points, freedom from oxidation and gum forming tendencies, an extremely low spread factor, and an almost negligible rate of loss through evaporation.

In order to insure that the lubricant will not itself corrode the bearings we preferably add a small quantity of an anti-rust or oxidation inhibitor. It has been found, for example, that approximately 0.25 percent by weight of dicyclo-amine soap of iso-amyl-octyl acid orthophosphate serves adequately to render the lubricating liquid wholly non-corrosive. Other well known inhibitors which will serve are thio beta naphthal, diphenol disulphide, triphenyl bismuth, tertiary butyl phenol sulphide, and in fact, any known inhibitor which is soluble in the principal ingredients, may be used where desired. The particular inhibitor which is chosen, will in large part determine the precise quantity used. In general, only a minor percentage need be added—just enough to obtain the desired corrosion-inhibiting effect.

Example 1

One example of a lubricant prepared in accordance with the invention has the following formula by weight:

| | Per cent |
|---|---|
| Tricresyl phosphate | 47.75 |
| Ethylene glycol monobenzyl ether | 42.00 |
| Triethylene glycol di-2-ethylbutyrate | 10.00 |
| Corrosion inhibitor | 0.25 |

The resulting product is a liquid having a kinematic viscosity of 275.8 centistokes at 0° F. and 9.47 centistokes at 100° F. It is therefore of such body as to be suitable for lubricating gyro instruments and similar devices. Of more importance is the fact that the liquid is clear and stable, and has no tendency to separate into its constituents over a wide range of temperatures. It was found, for example, that the lubricant did not cloud at −70° F., thus indicating no separation at that extreme temperature, and its pour point is at an even lower temperature. Available testing apparatus did not permit of the determination of the solidification point which must be at a still lower temperature.

It is apparent from the foregoing that this lubricant is well adapted to use under the wide extremes of temperature variation which are met in aircraft work, remaining a liquid and retaining its lubricating properties both at the higher temperatures which are met on the ground as well as the very low ones which are encountered in high altitude flights.

Upon oxidation and hydrolysis tests the liquid showed a viscosity change of only 6.66 percent without sediment formation, and when subjected to standard Navy test procedures (Navy Aer Spec. M537) it showed no tendency to corrode metals.

The spread factor of the lubricant was determined by placing a drop of it on a metal plate, and gauging the increase in area after a predetermined time in accordance with the Navy specification just mentioned. This test showed that our lubricant spread only 10.8 percent, which is of course far less than that of any normal oil, and even less than many of the fine watch oils. Of equal importance is the fact that the liquid has a very low volatility on tests showing an evaporation rate of .0582 per 24 hour day. These characteristics of course mean that the lubricant will stay in the bearing; not creep away, and further that it will not be lost by evaporation. Its use accordingly makes possible a lengthening of the normal cycle of lubrication of instruments, with entire safety and with attendant saving in idle time and expense.

*Example 2*

Another composition which we have prepared in accordance with the invention has the following formula by weight:

|  | Per cent |
|---|---|
| Tricresyl phosphate | 49.00+ |
| Ethylene glycol monobenzyl ether | 49.00+ |
| Corrosion inhibitor | 0.25 |

This composition proved to be a clear liquid having a viscosity of 318.7 centistokes at zero °F. and 9.5 centistokes at 100° F., and to have good lubricating properties within a wide range of temperatures. Thus it remains a liquid, and clear and stable, at temperatures above —60° F., and is capable of performing its lubricating functions at that very low temperature. The liquid begins to cloud, however, at temperatures in the neighborhood of —70° F., thus indicating some degree of separation at that temperature. The spread factor for the composition was determined in the manner previously mentioned and was found to be very good, being on the order of ten percent. Its rate of evaporation was also very low, being on the order of that mentioned for the first composition.

The addition of small percentages of triethylene glycol di-2-butyrate to the composition, with a reduction in the percentage of the other two ingredients, and principally the ethylene glycol monobenzyl ether, has the effect of lowering both the clouding and the pour point.

It is apparent from the foregoing that we can vary the percentages of the several ingredients mentioned herein within limits of from 40 to 50 per cent of the phosphate, from 40 to 50 per cent of the ether, and from 0 to 10% of the butyrate to produce a lubricant having just those properties needed to meet almost any special case which would be encountered in the lubrication of gyro instruments and other devices. Having thus described our invention in its preferred form, what we claim is:

1. A lubricant for instrument bearings or the like comprising tricresyl phosphate and ethylene glycol monobenzyl ether in about equal percentages by weight.

2. A lubricant for instrument bearings and the like consisting of from 40 to 50 percent by weight of tricresyl phosphate, from 40 to 50 percent by weight of ethylene glycol monobenzyl ether, and about 10 percent of triethylene glycol di-2-ethylbutyrate.

3. A lubricant for instrument bearings and the like consisting of about 40 percent by weight of ethylene glycol monobenzyl ether, about 10 percent by weight of triethylene glycol di-2-ethylbutyrate, and the balance of tricresyl phosphate.

4. A lubricant for instruments and the like consisting of about 47.75 percent by weight of tricresyl phosphate, of about 42.0 percent by weight of ethylene glycol monobenzyl ether; and of about 10.0 percent by weight of triethylene glycol di-2-ethylbutyrate.

5. A lubricant for instruments and the like consisting of about ten percent by weight of triethylene glycol di-2-ethylbutyrate, and of about equal proportions by weight of tricresyl phosphate and ethylene glycol monobenzyl ether.

JOHN D. MORGAN.
RUSSELL E. LOWE.